US007912896B2

(12) United States Patent
Wolovitz et al.

(10) Patent No.: US 7,912,896 B2
(45) Date of Patent: Mar. 22, 2011

(54) DATA ACCESS, REPLICATION OR COMMUNICATION SYSTEM COMPRISING A DISTRIBUTED SOFTWARE APPLICATION

(75) Inventors: Lionel Wolovitz, London (GB); Mark Gretton, London (GB); Bob Standen, Leamington Spa (GB)

(73) Assignee: Visto Corporation, Redwood City, CA (US)

( * ) Notice: Subject to any disclaimer, the term of this patent is extended or adjusted under 35 U.S.C. 154(b) by 175 days.

(21) Appl. No.: 10/553,721

(22) PCT Filed: Apr. 19, 2004

(86) PCT No.: PCT/GB2004/001685
§ 371 (c)(1),
(2), (4) Date: Sep. 6, 2006

(87) PCT Pub. No.: WO2004/095806
PCT Pub. Date: Nov. 4, 2004

(65) Prior Publication Data
US 2007/0130255 A1    Jun. 7, 2007

(30) Foreign Application Priority Data

Apr. 17, 2003    (GB) .................................. 0308991.9

(51) Int. Cl.
*G06F 15/16* (2006.01)
(52) U.S. Cl. ......... 709/203; 709/204; 709/227; 709/232
(58) Field of Classification Search .................. 709/203, 709/204
See application file for complete search history.

(56) References Cited

U.S. PATENT DOCUMENTS

| 5,754,765 | A | * | 5/1998 | Danneels et al. ............. 709/222 |
| 5,790,789 | A | * | 8/1998 | Suarez .......................... 709/202 |
| 5,826,014 | A | | 10/1998 | Coley et al. |
| 5,832,514 | A | * | 11/1998 | Norin et al. ................... 707/202 |
| 5,850,517 | A | | 12/1998 | Verkler et al. |

(Continued)

FOREIGN PATENT DOCUMENTS

EP    0 993 165 A2    4/2000
(Continued)

OTHER PUBLICATIONS

International Search Report of PCT Application No. PCT/US01/17160, Aug. 26, 2002, 5 pages.

(Continued)

*Primary Examiner* — Ario Etienne
*Assistant Examiner* — Blake Rubin
(74) *Attorney, Agent, or Firm* — Oblon, Spivak, McClelland, Maier & Neustadt, L.L.P.

(57) ABSTRACT

A data access, replication or communications system is distributed across a terminal-side executable running on a terminal and a server-side executable. Together the terminal-side executable and the server-side executable form a client to a larger server and collaborate by sending messages using a message queuing system over a network. The larger server can be, for example, a mail server. Splitting the client into a terminal-side executable and a server-side executable allows a terminal, such as mobile device with limited processing capacity, power, and connectivity, to enjoy the functionality of full-featured client access to a server environment using minimum resources on the mobile device by distributing some of the functionality normally associated with the client onto the server side executable, which is not so resource constrained.

22 Claims, 7 Drawing Sheets

The Small Client can include a terminal-side component, plus the client side MOM; the Small Server can also include a server-side component, plus the server side MOM:

U.S. PATENT DOCUMENTS

| | | | |
|---|---|---|---|
| 5,857,201 A | 1/1999 | Wright, Jr. et al. | |
| 5,878,056 A * | 3/1999 | Black et al. | 714/748 |
| 5,895,471 A | 4/1999 | King et al. | |
| 6,078,948 A * | 6/2000 | Podgorny et al. | 709/204 |
| 6,289,382 B1 * | 9/2001 | Bowman-Amuah | 709/226 |
| 6,351,771 B1 * | 2/2002 | Craddock et al. | 709/227 |
| 6,424,841 B1 * | 7/2002 | Gustafsson | 455/466 |
| 6,473,794 B1 * | 10/2002 | Guheen et al. | 709/223 |
| 6,510,550 B1 * | 1/2003 | Hightower et al. | 717/108 |
| 6,792,085 B1 * | 9/2004 | Rigaldies et al. | 379/88.13 |
| 6,802,068 B1 * | 10/2004 | Guruprasad | 719/319 |
| 6,877,023 B1 * | 4/2005 | Maffeis et al. | 709/202 |
| 6,947,761 B2 * | 9/2005 | Hutcheson et al. | 455/518 |
| 6,947,943 B2 | 9/2005 | DeAnna et al. | |
| 6,990,513 B2 * | 1/2006 | Belfiore et al. | 709/203 |
| 7,020,697 B1 * | 3/2006 | Goodman et al. | 709/223 |
| 7,020,783 B2 * | 3/2006 | Vange et al. | 726/5 |
| 7,035,828 B2 | 4/2006 | Ketonen et al. | |
| 7,136,645 B2 * | 11/2006 | Hanson et al. | 455/435.1 |
| 2002/0049841 A1 * | 4/2002 | Johnson et al. | 709/225 |
| 2002/0138582 A1 * | 9/2002 | Chandra et al. | 709/206 |
| 2003/0130913 A1 * | 7/2003 | Ehrman et al. | 705/28 |
| 2004/0172453 A1 * | 9/2004 | De Mendonca et al. | 709/206 |
| 2004/0203749 A1 * | 10/2004 | Iyer et al. | 455/432.1 |
| 2008/0279204 A1 * | 11/2008 | Pratt et al. | 370/406 |

FOREIGN PATENT DOCUMENTS

| | | |
|---|---|---|
| WO | WO 97/46939 | 12/1997 |
| WO | WO 01/77815 | 10/2001 |
| WO | WO 01/93033 | 12/2001 |
| WO | WO 02/06964 | 1/2002 |

OTHER PUBLICATIONS

International Search Report of PCT Application No. PCT/US01/10883, Feb. 27, 2002, 3 pages.

International Search Report of PCT Application No. PCT/US97/08856, Oct. 15, 1997 3 pages.

GloMop Group, GloMop: Global Mobile Computing by Proxy, Sep. 15, 1995, 12 pages.

Mark R. Brown, Using Netscape™ 2, Special Edition, The Most Complete Reference (Chapter 33); 1995; 25 Pgs. (RIMV00055304-RIMV00055328).

Microsoft Exchange 2000 Server, Customizing Microsoft® Outlook® Web Access White Paper; Published Nov. 2001; 106 Pgs. (RIMV00055329-RIMV00055434).

Microsoft Exchange 2000 Server, Microsoft® Outlook Web Access in Microsoft Exchange 2000 Server; Published Mar. 2000 (Updated May 2002; 18 Pgs. (RIMV00055435-RIMV00055452).

KC Lemsen, et al.; Using Microsoft® Exchange 2000, Front End Servers; Published Jun. 2000 (Updated Oct. 2002; 95 Pgs. (RIMV00055453-RIMV00055541).

Steffen Lipperts, Anthony Sang-Bum Park, An Agent-Based Middleware—A Solution for Terminal and User Mobility, 1999, Computer Networks.

John Lamb, Peter Lew, Lotus Notes and Domino 5—Scalable Network Design—Web Server Network Infrastructure, 1999, McGraw-Hill.

A. Frier, P. Karlton, and P. Kocher, The SSL 3.0 Protocol, Nov. 18, 1996, Netscape Communications Corp.

"Java Message Service", Sun Microsystems Corp., Mountain View CA, Nov. 9, 1999.

* cited by examiner

Terminal resource constraints are met in essence through the combination of a 'distributed client collaborating across a message queuing system, such as a MOM Connection constraints are met in essence through the combination of a message queuing system, such as a MOM, used by a platform operating in a 'session independent' manner The Transcend Mail and MobileMQ systems address both terminal resource constraint as well as connection constraints

Figure 4

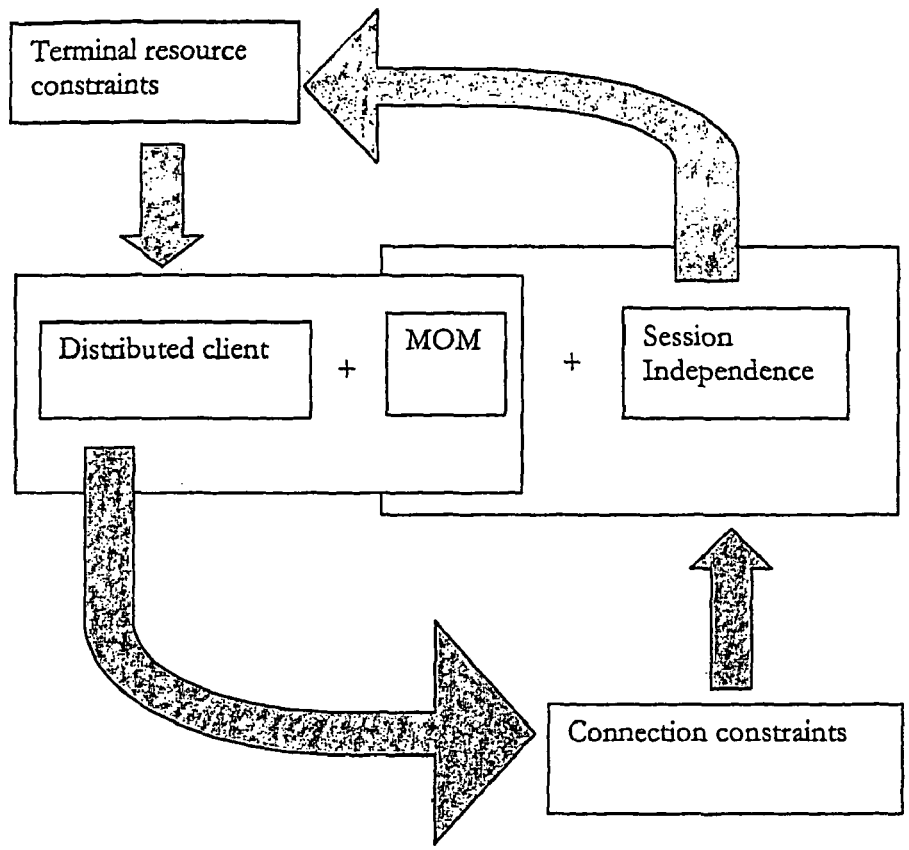

Event based data replication, arising through the distributed client solution, also addresses connection constraints and is inherently session independent.

Imposing session independence enables functions normally delivered in a session dependent manner than is not necessarily suitable for resource constrained devices to be deployed in a manner that is now fit for purpose. These functions include reliability of message delivery, sender authentication, message security, data rate flow control and packet routing.

A 'Distributed Client' model

The Small Client can include a terminal-side component, plus the client side MOM; the Small Server can also include a server-side component, plus the server side MOM:

The Small Client can include a program – e.g. an e-mail application, plus plug-in linking it to the terminal-side component.

The Small Client can also exclude the program, e.g. a contacts program. The terminal side component then communicates with the contacts program via the contacts database (with event triggers from that database being sent to the terminal side component):

This is conceptually equivalent to the following middleware architecture:

DATA ACCESS, REPLICATION OR COMMUNICATION SYSTEM COMPRISING A DISTRIBUTED SOFTWARE APPLICATION

FIELD OF THE INVENTION

This invention relates to a data access, replication or communication system comprising a distributed software application.

DESCRIPTION OF THE PRIOR ART

Wireless terminals, such as smartphones, mobile telephones, wireless PDAs etc, typically have severe memory, processing power and battery constraints. As a result, using terminals of this sort to access, replicate or communicate data presents significant challenges. For example, if one uses the wireless terminal to store one's contacts and calendars and also send and receive e-mails, then, conventionally a requirement to synchronise datasets to a master dataset on a remote server arises. Synchronisation between servers and mobile devices traditionally takes place using relatively high bandwidth, low latency, un-metered connectivity (e.g., USB or IR). As a result, synchronisation systems often employ a methodology that transmits large amount of data and is not very robust when data is lost in transmission or the underlying transmission is interrupted. For example, server based dataset synchronisation typically requires all connected devices to download their entire datasets (e.g. all e-mails, all contacts etc) to the server over a single session, which can then perform a comparison against its master copy of the last fully synchronised dataset in order to update the master and hence all other datasets. This approach is unattractive for synchronising wireless devices because of the power drain it imposes, the potentially long connection time and costly data transfer.

SUMMARY OF THE PRESENT INVENTION

The present invention envisages a data access, replication or communications system comprising a software application that is distributed across a terminal-side component running on a terminal and a server-side component;
   in which the terminal-side component and the server-side component (i) together constitute a client to a server and (ii) collaborate by sending messages using a message queuing system over a network.

Hence, we split (i.e. distribute) the functionality of an application that serves as the client in a client-server configuration (for example, in a Microsoft Exchange e-mail environment) into component parts that run on two or more physical devices that communicate with each other over a network connection using a message queuing system, such as message oriented middleware. The component parts collectively act as a client in a larger client-server arrangement, with the server being, for example, the Exchange mail server. We call this a 'Distributed Client' model. A core advantage of the Distributed Client model is that it allows a terminal, such as mobile device with limited processing capacity, power, and connectivity, to enjoy the functionality of full-featured client access to a server environment using minimum resources on the mobile device by distributing some of the functionality normally associated with the client onto the server side, which is not so resource constrained. (Whilst the present invention therefore has particular utility where the terminal is a wireless terminal (e.g. a smartphone) and the network is a wireless network (e.g. GPRS), it is not limited to these embodiments. It therefore also covers, for example, the terminal being a desktop PC communicating with a remote server over a wired network).

Unlike other distributed models, in an implementation of the present invention, each component part can provide functionality (that goes beyond merely accessing cached/stored data) independently of the other, even when the network connection is absent. For example, in a conventional distributed client, such as e-mail web access using a web browser and a web server distributed client accessing a Microsoft Exchange mail server, if you break the connection between the browser and the web server then the browser has no functionality, other than to continue to display any cached e-mails. But with an implementation of the present invention, the terminal-side component may also insulate a terminal program (e.g. contacts, calendar, e-mail etc) from being affected if the connection over the network is broken by also queuing messages in readiness for the connection to be re-established, enabling the terminal program to proceed to its next task. Hence, the user experience of using the e-mail or PIM applications on the terminal (e.g. smartphone, PC) is exactly the same, whether there is a connection or not. The user can continue to create e-mails, edit contacts etc. on his terminal. The user is insulated from the state of the network connection because the terminal can queue messages, using the message queuing system, until such time as the connection is re-established and can then automatically send them. Equally, the server-side component may insulate a server program from being affected if the connection over the network is broken by also queuing messages in readiness for the connection to be re-established, enabling the server program to proceed to its next task.

Because this approach facilitates making the terminal side insulated from the vagaries of network performance by interposing a message queuing platform across the network, it is also better when the network is a wireless network, with highly unpredictable bandwidth, coverage and availability. Hence, the Distributed Client model directly address the problem of providing a good user experience at the terminal (e.g. the end-user is always able to interact with his PIM, calendar and e-mail applications, irrespective of network coverage) despite the terminal having major resource constraints and despite the connection having major constraints.

One implementation detail optimised for a Distributed Client is that each queued message defines part or all of an 'event', in which an event describes a change to the data stored at either the terminal or server in enough detail to enable data replication to take place without the need for a conventional synchronisation engine; data replication is hence achieved by sending 'events', rather than a complete dataset (or sub-set of a dataset) of stored data for synchronisation. The terminal-side component can create events and queue those events, itself and/or in the message queuing system, enabling the terminal-side component to proceed to its next task, even if the network connection is broken. Equally, the server-side component can create events and queue those events, itself and/or in the message queuing system, enabling the server-side component to proceed to its next task, even if the network connection is broken. Queued events may persist in non-volatile memory on the terminal even when the wireless terminal is switched off. Equally, queued events may persist in non-volatile memory on the host which runs the server-side component even when the server is switched off (it may be noted that the host which runs the server-side component is unlikely to be the same host that runs the server, although it could be).

The terminal-side component and the server-side component may collectively constitute middleware between a terminal program running on the wireless terminal and a server program running on the server.

The application may also comprise a distributed application platform that makes calls to a distributed communications platform that provides the message queuing functionality, in which the communications platform enables delivery of a message over the network to be reliable, even if an unreliable transport protocol is used, in which the communications platform operates in a 'session independent' manner.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by this specification. The scope of the advancements embraced by the specification and drawings are defined by the words of the accompanying claims.

FIG. 4 is a schematic diagram of messaging in a session-independent, distributed client system according to the exemplary embodiment of the present advancement;

DETAILED DESCRIPTION

1. Introduction

Figure 1:
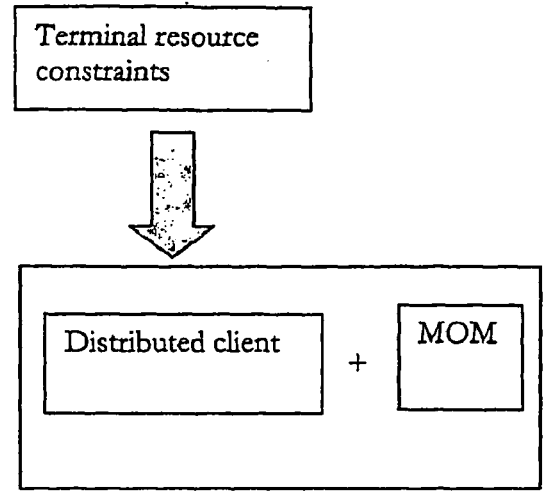
FIG. 1 is a schematic drawing of a distributed client model according to an exemplary embodiment of the present advancement.

The present invention will be described with reference to an implementation from Visto Corporation. The implementation comprises a middleware communications platform called MobileMQ™ and a distributed application layer called Transcend Mail™.

Transcend Mail is an end-to-end GPRS-connected application that runs on (i.e. is distributed across both) a SymbianOS™ smartphone wireless terminal and a Windows 2000 server. It allows an e-mail, contacts and calendar application on a SymbianOS smartphone to use the MobileMQ platform to perform automatic data replication over GPRS with a Microsoft Exchange™ mail server. MobileMQ is a message-oriented middleware platform that is again distributed across both the smartphone and the server. It provides the GPRS-efficient, reliable and secure means of communication that enables many aspect's of Transcend Mail's user experience. MobileMQ can be used wherever there is a requirement for remote data access, replication or communication over a network (whether wired or wireless). MobileMQ uses an unreliable underlying transport protocol that is session independent.

Transcend Mail allows mobile workers to access their company email, contacts and calendar entries from their Symbian-based GPRS smartphones. It is designed to meet three needs of the mobile worker:

1. It enables them to remain 'in-touch' whilst away from their desk, enabling them to be responsive to customer, market, and business needs.
2. It ensures that their contacts and calendar remain 'up-to-date' so that these can effectively be co-ordinated with co-workers.
3. It enables productive use to be made of 'dead-time' whilst between appointments, waiting for transport, or during travel.

Transcend Mail enables the following features:

Allows the terminal device user interface to work with local data so the GPRS latency, low and variable bandwidth and intermittent does not stop the e-mail, contacts and calendar applications from being always available and responsive Automatically replicate changes between the local data and the server side data in a timely way and in background, without bothering the user Be parsimonious in using GPRS so that the customer gets appropriate value from the network operator's GPRS tariff and does not get what is sometimes called "bill shock"

Allows flexibility in the way that customer organisations connect their workers' GPRS mobile phones to the company LAN Integrate as seamlessly as possible with the mobile phone application suite so that the user does not have to learn a new system Integrate as seamlessly as possible with the back end email server so that the IT administrator is comfortable and has a good user experience too Different applications on the terminal device can send/receive independently, so that one can still update one's calendar even though downloading a very large e-mail attachment.

2. Core Design Principles

In an implementation of the present invention, we split (i.e. distribute) the functionality of the Transcend Mail application that serves as the client in a client-server configuration (for example, in a Microsoft Exchange environment) into component parts that run on two or more physical devices that communicate with each other over a wide area connection using the MobileMQ message oriented middleware. The component parts collectively act as a client in a larger client-server arrangement, with the server being the Exchange mail server. We call this a 'Distributed Gent' model. A core advantage of the Distributed Gent model is that it allows a terminal, such as mobile device with limited processing capacity, power, and connectivity, to enjoy the functionality of full-featured client access to a server environment using minimum resources on the mobile device by distributing some of the functionality normally associated with the client onto the server side, which is not so resource constrained.

But unlike other distributed models, in Transcend Mail, each component part can provide functionality (that goes beyond merely accessing cached/stored data) independently of the other, even when the network connection is absent. For example, in a conventional distributed client, such as e-mail web access using a web browser and a web server distributed client accessing a Microsoft Exchange mail server, if you break the connection between the browser and the web server then the browser has no functionality, other than to continue to display any cached e-mails. But with Transcend Mail, the user experience of using the e-mail or PIM (contacts, calendar) applications on the smartphone is exactly the same, whether there is a connection or not. The user can continue to create e-mails, edit contacts etc. on his smartphone. The user is insulated from the state of the network connection because the terminal can queue messages, using MobileMQ (and its own queue as well if the MobileMQ queue is full); until such time as the connection is re-established and can then automatically send the next queued message. Similarly, the next queued message stored server-side can be automatically sent when the connection is re-established.

This approach is also better when the network is a wireless network, with highly unpredictable bandwidth, coverage and availability because it facilitates making the terminal side insulated from the vagaries of network performance by interposing a message queuing platform (i.e. MobileMQ) across the network. Hence, the Distributed Client model directly address not only the problem of providing a good user experience at the terminal (e.g. always able to interact with his contacts, calendar, and e-mail applications, irrespective of network coverage) despite the terminal having major resource constraints and despite the connection having major constraints. This is schematically illustrated in FIG. 1.

The MobileMQ message oriented middleware (MOM) communications platform enables the component parts to effectively and efficiently store messages to be sent between component parts and actually send them reliably. The MobileMQ MOM enables message delivery over a network to be reliable, irrespective of whether the underlying transport protocol used is reliable or not; and independent of any session. The transport protocol is therefore referred to as 'session independent'. This again marks a major departure from normal networking protocols, such as WAP, which are session based. 'Session independent' (as noted earlier) therefore stands in contrast to session based. Session based protocols tear down a session when data transfer rates fall below a threshold or after a timeout. They will then initiate a new session requiring the exchange of data traffic, which is (a) costly in a wireless system where users pay for the amount of data transmitted and (b) not infrequent due to the highly variable bandwidth associated with wireless networks. A session independent protocol however does not deliberately tear down a connection. (We distinguish here situations where the underlying PDP context is merely released or reassigned for use by other applications, or the current underlying PDP context is lost or otherwise times out. In these types of cases, the higher layer session-independent protocol merely suspends communication activity pending re-acquisition of a PDP context—it does not need to re-establish a 'session', as such.)

Figure 2:
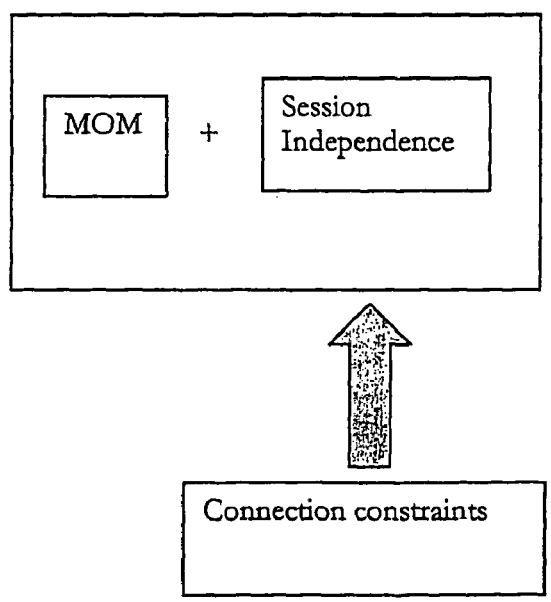
FIG. 2 is a schematic drawing of using message oriented middleware and session independence according to the exemplary embodiment of the present advancement.

The combination of MobileMQ MOM and session independence addresses many connection constraint problems, as illustrated in FIG. 2:

Further, with a session independent protocol, there is no re-establishing of a session as such; instead, a sending component simply re-starts sending as soon as it knows how to address its messages to the receiving component of the distributed client. This is especially useful in the wireless context since a wireless device does not (unless and until IPv6 is available) have a permanent IP address at all, but instead can only receive IP based messages via an arbitrarily selected IP address that is frequently changed. Hence, session independence fits well the requirements of sending messages to wireless devices with transitory address, yet with the minimum of overhead need to cope with these changing addresses, since it avoids the overhead of session re-establishment.

Transcend Mail also adopts 'event' based data replication—i.e. a log is kept of all new events which define a change to the data stored on the client or the server sides and only these events are queued in a log. When a connection is established between each side of the distributed client, then each queued event (as represented by one or more message depending on the complexity of the event) is sent, with a single message being carried by one or more packets. Because MobileMQ allows the efficient and reliable transfer of messages, it is particularly well matched to an event based data replication system, which itself requires no more than the efficient and reliable transfer of messages.

The higher level applications using the MOM have no awareness of connection status—i.e. MobileMQ is a MOM layer that insulates applications using MobileMQ from needing to be aware of the existence or non-existence of an underlying connection (such as an active PDP context). At the application layer, the system is 'connection independent'. The term 'session independent' therefore equates at the application layer conceptually to a system in which there is a single session that persists independently of whether an actual connection is established or not in the sense that, when a connection is re-established after a break, an application can re-commence message transfer at exactly the same place where it ceased—i.e. the next message sent by an application is the same message that would have been sent had there been no connection break. In session based systems, that does not happen. Instead, considerable overhead is first taken up in re-establishing a session. Once the session is re-established message transfer re-commences, although re-commencing the message transfer might well involve re-transmitting huge portions of previously transmitted message data—yet more unproductive data transfer.

In MobileMQ, reliability (i.e. being able to guarantee that a message has been received) is achieved without recourse to high overhead session based protocols. Instead, we require receipt at the sending device of an acknowledgement that an individual message has been received and properly processed at the receiving device before allowing another message to be sent. This 'message level' reliability is much more data efficient since it requires minimal overhead in re-starting communication if a connection is lost, unlike session based systems. This is a critical advantage, especially in wireless networks, where lost connections are not infrequent.

Authentication is, in the prior art, achieved with high data transfer overhead at the start of a session. Because the MobileMQ MOM is session independent, it instead provides for authentication of each message: 'message level' authentication. This may be combined with session level authentication, based on session numbers that increment whenever a device is rebooted.

Figure 3:
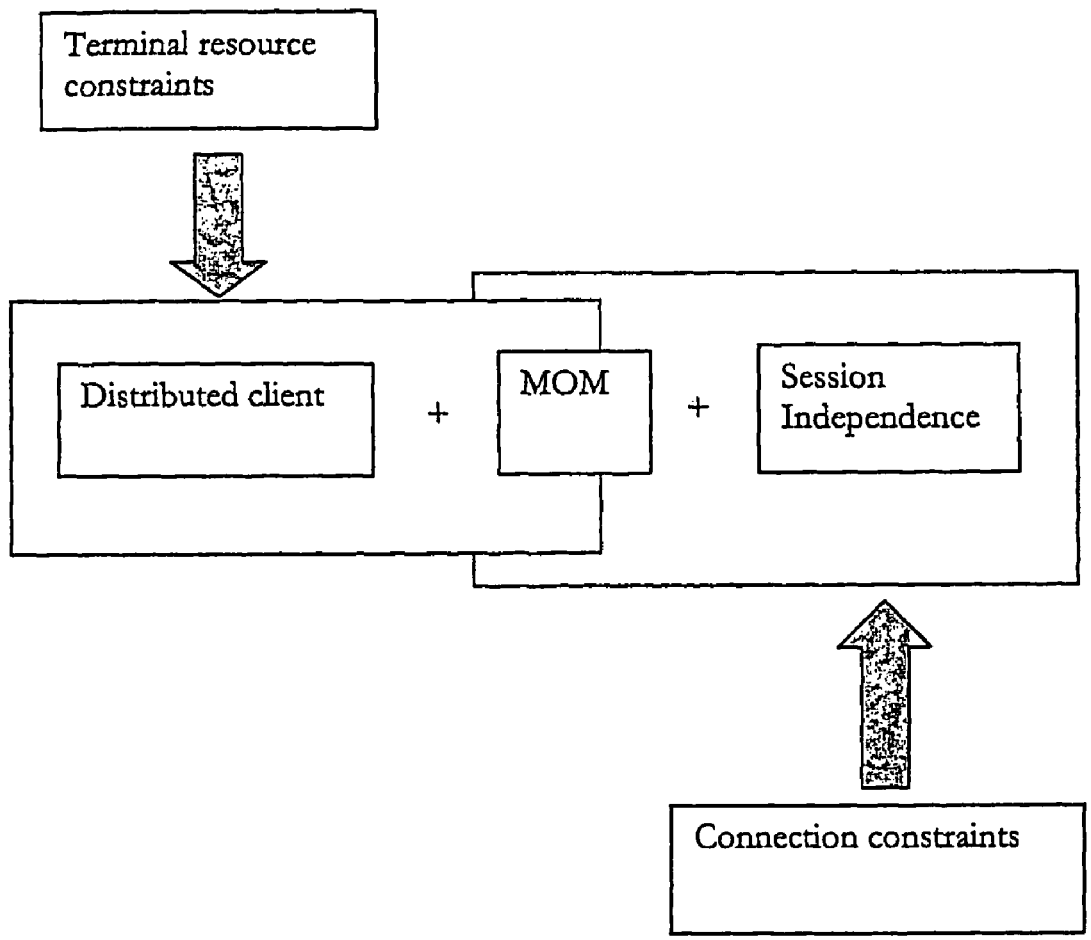
FIG. 3 is a schematic drawing of another distributed client model according to the exemplary embodiment of the present advancement.

MobileMQ when combined with Transcend Mail is a comprehensive and effective solution to the twin problems of efficiently handling terminal resource and connection constraints, as shown in FIG. 3.

FIG. 4 shows how the combined design allows session independent features provide by the MOM that would normally be provided by a session based system to be deployed in a manner that is fit for the purpose of resource constrained terminals, such as smart phones. These features include:
(a) reliability of message delivery,
(b) sender authentication;
(c) message security,
(d) data rate flow control;
(e) packet routing.

Likewise, it shows how the combined design allows features designed to be fit for the purpose of a distributed client to also address connection constraints. The main feature is the use of 'event' based data, and because of this gains the character of being session-independent.

3. Core Design Principles in More Depth

3.1 Distributed Client

The purpose of the distributed client is to allow a mobile device with limited processing capacity, power, and connectivity, to enjoy the functionality of full-featured client access to a server environment using minimum resources on the mobile device by distributing some of the functionality normally associated with the client onto the server side, which is not so resource constrained. The client applications are PIM (calendar, address book etc.) and messaging (e-mail, MMS, fax, SMS etc).

Figure 5:
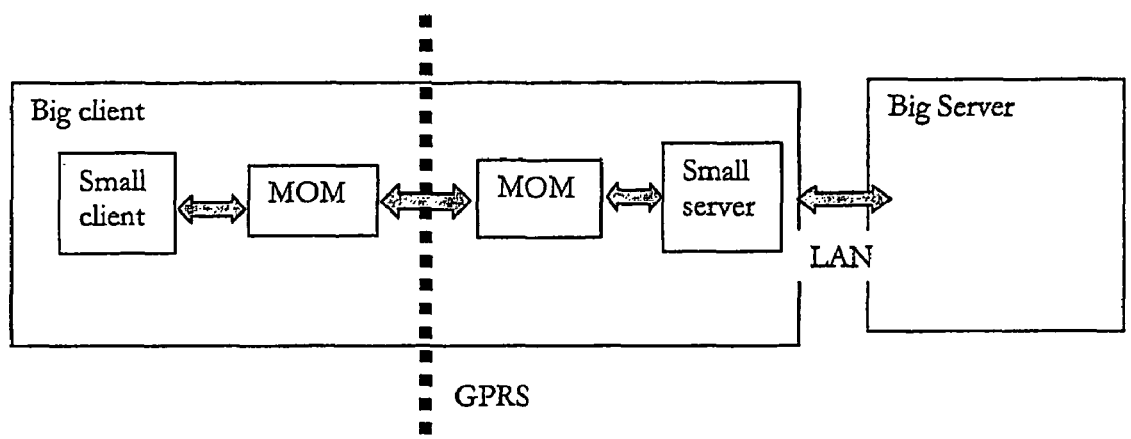
FIG. 5 is a schematic diagram of a distributed client model according to the exemplary embodiment of the present advancement.

In effect, we have a split client-server application that collectively acts as the client in a larger client-server application. A typical configuration is to install software on a mobile device such as a smart phone (the small client) and corresponding software on a server device (the small server). These two pieces of software communicate with one another—normally over high latency, low bandwidth, metered wireless connectivity such as GPRS or UMTS, via a MOM, such as MobileMQ. The small client and small server collectively act as a client (the "large client" or "distributed client") in a traditional client-server environment. The large client then communicates with the relevant server such as Microsoft Exchange (the large server) as normal. Thus, the large server is only aware that it is communicating with the large client. The large client appears to the large server like any other client with which it normally communicates and the distributed nature of the large client is invisible to the large server. (In a typical configuration, it is assumed that the small server will reside on or near the same device where the large server resides.) FIG. 5 schematically illustrates this.

Functions within the distributed client are split between the small server and the small client. This split has been optimised to take advantage of the "smart" nature of the mobile device, while limiting the impact on that device's limited resources.

Thus, the small client residing on the mobile device (i.e. Transcend Mail, in this case working in conjunction with the local e-mail application) generally acts as the user interface for the mobile user, acts as a local data store, and undertakes certain data processing tasks locally. Among others, the small client undertakes the following functions:
Displays a list of emails in the mobile in-box
Acts as a viewer for the body of email text
Accepts user requests to forward, create, or reply to email
Accepts user input for new email text
In response to user input, releases email from mobile device memory only (a Release action)
In response to user input, releases email from mobile device memory and generates a notice to release the same email from the large server (a Delete request)
Accepts end user input of logon password for the large server and passes this to the small server (see below for description of 'distributed logon')
Monitors the local data store for changes to that data (such as new, modified, or deleted entries), creates an event detailing the changes, and sends these to the small server.
Receives events from the small server, and uses the details of changed data to update the local data store.
Equivalent or analogous PIM and non-e-mail functionality would be handled where the small client handles/integrates to PIM and non e-mail (e.g. other kinds of messaging) functions.

Similarly, the small server resides on other media (typically a LAN connected to the large server) and communicates with the mobile device via a data network connection that traverses wireless infrastructure (e.g. GPRS) and generally acts as the direct interface to the large server (such as Microsoft Exchange) and undertakes many data processing tasks normally associated with the large client. Among others, the small server undertakes the following functions:
Completes construction of emails requested by the mobile user in accordance with the large server API, taking components received from the small client, the small server, and the large server as necessary
Takes emails from the large server and splits these into component parts, sending only those parts deemed strictly necessary to the small client
Responds to requests from the small client to deliver additional email content (e.g., additional text of long emails and/or attachments)
Takes logon password data (supplied by the end user via the small client) and saves this in local memory, thus enabling extended logon to the large server (see below for description of distributed logon)
Monitors the local data store at the large server for changes to that data (such as new, modified, or deleted entries), creates an event detailing the changes, and sends these to the small client.
Receives events from the small client, and uses the details of changed data to process updates to the local data store at the large server.
Equivalent or analogous PIM and non-e-mail functionality would be handled where the small client handles/integrates to PIM and non e-mail (e.g. other kinds of messaging) functions.

One consequence of this approach is that mail on a large server cannot be said to be 'forwarded' or 'redirected' to a device in the manner of a conventional push e-mail system: instead the device (where the small client resides) together with the small server is simply another client to the mail server (and that client is also not a simple wireless device client as well).

The Transcend Mail small server and the small client communicate with one another via the MobileMQ MOM. As noted above, this enables the unusual feature of the small server and small client (which together constitute the large client in a distributed client server system) to operate asynchronously of one another.

Figure 6:
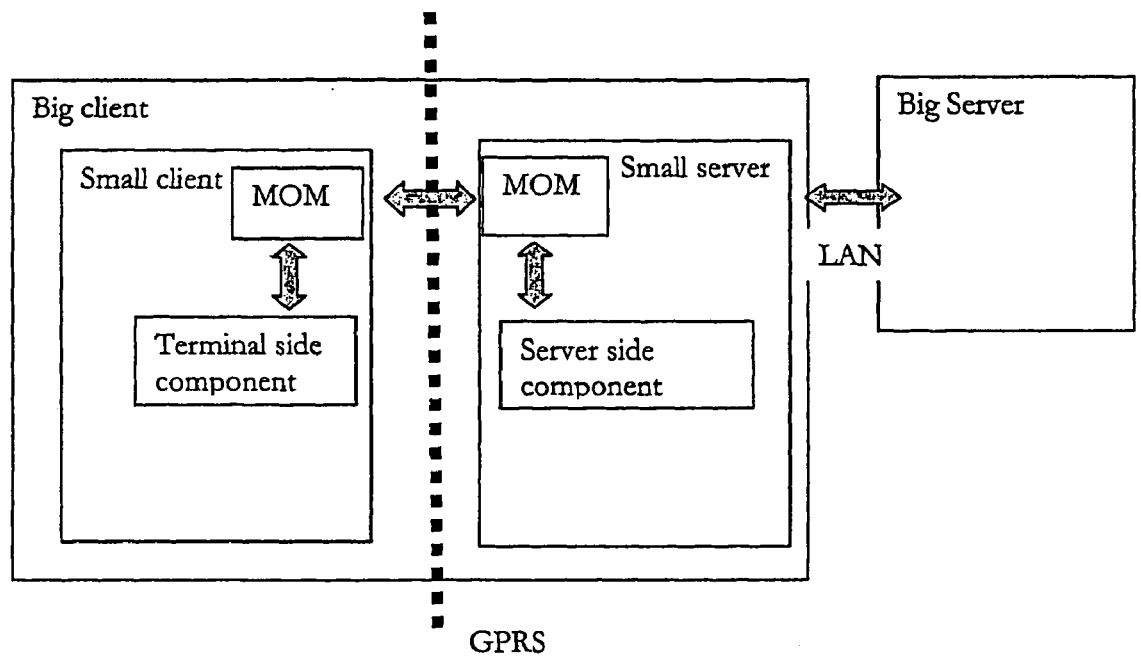
FIG. 6 is a schematic diagram of another distributed client model according to the exemplary embodiment of the present advancement.

There are various permutations of the small client: for example, as shown in FIG. 6, the small client could be implemented as a terminal-side component, that either includes or communicates with a client side MOM; the Small Server can then be implemented as a server-side component, that either includes or communicates with a server side MOM.

Figure 7:
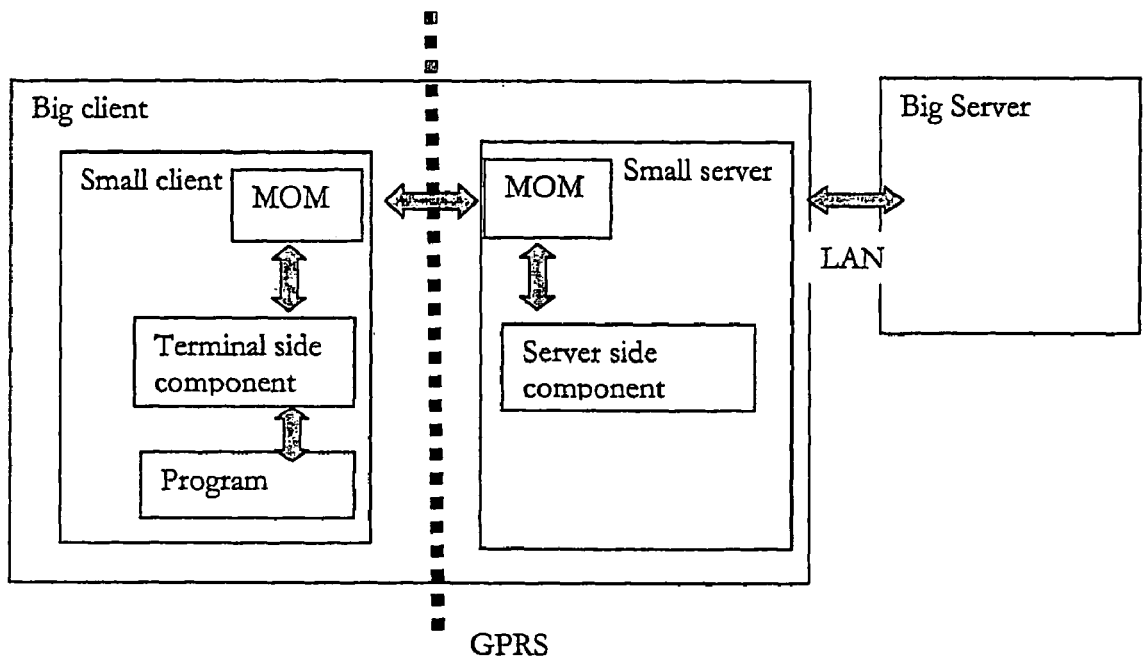
FIG. 7 is a schematic diagram of a further distributed client model according to the exemplary embodiment of the present advancement.

FIG. 7 shows how the Small Client can include a program—e.g. an e-mail application, plus plug-in linking it to the terminal-side component.

Figure 8:
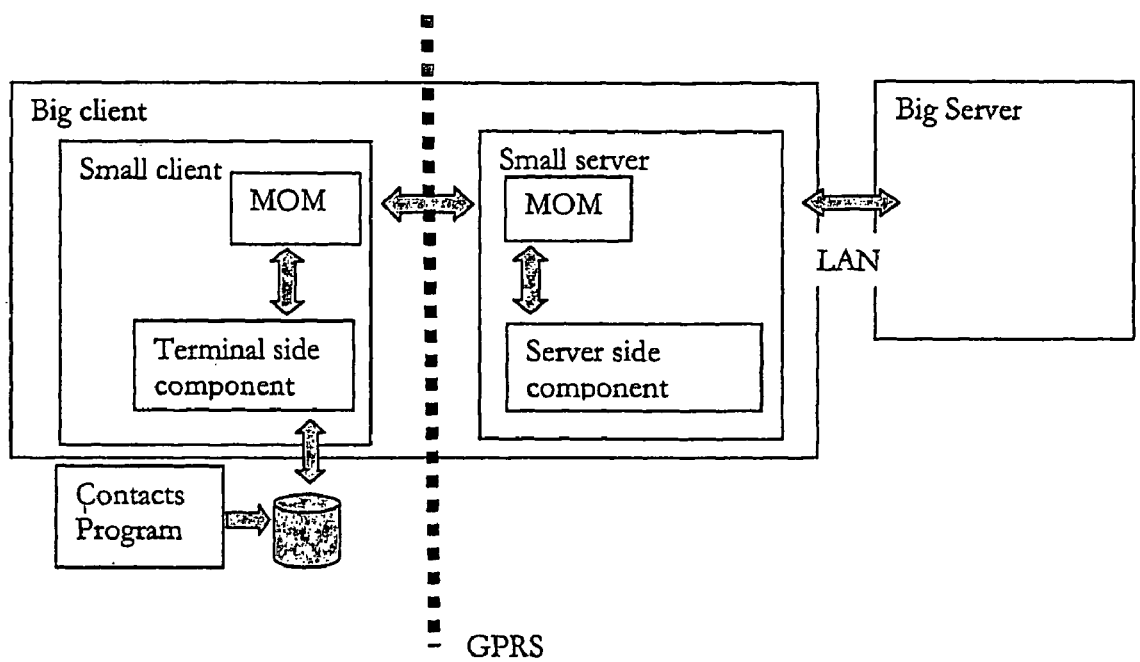
FIG. 8 is a diagram of small client functionality within a distributed client model according to the exemplary embodiment of the present advancement.
Figure 9:
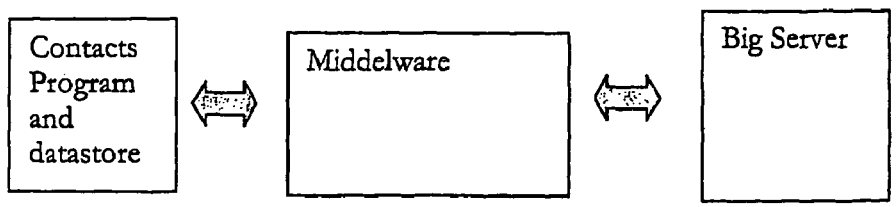
FIG. 9 is a diagram of a middleware architecture according to the exemplary embodiment of the present advancement.

FIG. 8 shows that the Small Client can also exclude the program, e.g. a contacts program. The terminal side component then communicates with the contacts program via the contacts database (with event triggers from that database being sent to the terminal side component). FIG. 9 shows how this is conceptually equivalent to a middleware architecture.

3.2 Distributed Logon

The distributed client splits the logon function between the small client and the small server. The small client obtains the user password from end user input. Upon receipt of the password input, the small client sends this data to the small server. The small server retains this data locally in memory, and then communicates the logon to the large server.

Hence, Transcend Mail acts as the wireless terminal user's agent on the server; it caches passwords and does other logon-related acts that are normally done by a user when interacting with the mail server. Only when a password is time expired by the mail server administrator will a user therefore need to personally log in again with the new password. This is a big improvement in security over other mail redirection methods which require to log on as a super-user which can access all email accounts.

Another advantage of distributing the logon in this fashion is that it allows the distributed client to continue communication with the large server without additional logon activity (and associated wireless data traffic) even if there is an interruption in communication between small server and small client. This also allows possession and use of the mobile device (which may have its own security protocols) to serve as a substitute for additional large server logon activity. Once the small server, has the password information it becomes possible to replicate logons to the large server based on the assumption that control of the mobile device serves as a kind of substitute for logon information. This allows the distributed client to access the large server after an interruption in service without prompting the user for additional password data. This provides advantage by reducing data traffic associated with logon activity, and also speeds up end user access to the large server, particularly on mobile devices with small keyboards that are inconvenient for entering password data.

3.3 Remote Message Construction

Transcend Mail also minimises use of wireless transmission by employing a method of constructing messages remotely. When the distributed client "retrieves" messages from the large server, some of this data is queued at the small server and the small server then determines how much of this data is sent to the small client. The specific amount of data sent to the small client can be influenced by end user configuration and by specific request. For example, the end user can specify a maximum number of lines of email text are delivered to the small client, and the end user can then request that the small server send additional text and/or attachments. Remote message construction comes into play when the end user directs an action such as replying to or forwarding an email. When forwarding an email with an unmodified attachment, the small server is able to construct the bulk of the email message locally without the need for full transmission from the small client. The queued message simply references the relevant unmodified data held on the large server (in this example, an attachment). In effect, the small client is only required to transmit that part of the message that has been modified by the user at the small client device. The same principal applies to email replies. The small client does not need to transmit the entire body of the original message—the small server constructs the total reply by taking new text transmitted from the small client to the small server and combining this with the original email text—already known to the small server since it is stored on the large server. In effect, the small client has issued an instruction that results in the small server constructing the total message taking parts from both the small client and the large server. Avoiding unnecessary key input is valuable for a small keyboard smartphone. These are both methods for dramatically reducing the amount of data traffic between the small client and the small server.

3.4 Tidy Process

Transcend Mail also helps to conserve memory on the mobile device using an automated memory "tidying" function. The small client monitors use of non-volatile memory on the mobile device. When non-volatile memory in use exceeds a trigger amount (for example, 80% of memory capacity in use) then it automatically starts to "tidy" the local data related to email information on the device. This consists of selecting certain emails which have not been accessed locally for a longer period of time and releasing from local memory much of the data associated with these emails (for example, attachments and message text), whilst retaining the email header information in local memory. The data released from local memory is selected using pre-set criteria such as age of the relevant email message (oldest first) or history of access by the user to this email; email messages not accessed for long periods of time are removed from local memory before newer or recently accessed email messages.

Message data is not released from memory if the relevant message is marked as unread, open for user viewing or action, or there is a pending action related to the email requesting additional data from the large server.

This removal process continues until the small client detects that non-volatile memory in use has descended below a pre-set "safe" level (for example, 70% of memory in use). The email data is not "deleted" as the large server retains all email data and the small client retains email header data.

The removed data can be replaced in local memory by downloading it once again from the server to the mobile device on user request (a 'Retrieve' action). The user is clearly warned before such a Retrieve takes place. This allows the user an opportunity to decide whether or not Retrieving the message data is cost effective.

The tidy function also includes safety mechanisms that handle the circumstance where a particularly large email or attachment might push the mobile device beyond the trigger point for tidying without an opportunity to review the downloaded. In other words, the design is meant to avoid a circumstance where the mobile device might remove email data before it is read. In this circumstance, the system temporarily adjusts the trigger level and the safe level of memory use to allow the end user an opportunity to review the large in-bound email.

3.5 Converted Attachment Download Option

A perennial difficulty in mobile devices that share replicated data with a server is how the user can make best use of the limited memory and processing capacity on the mobile device. In mobile email applications, this problem has traditionally been addressed (in MS ActiveSync and others) through limiting the amount of email data that is shared with the mobile device. This limitation usually takes the form of replicating only limited number of days of email data, and limiting the size of the email data shared. One common method of limiting the amount of data replicated is to withhold email attachments from replicating on the mobile device. Typically, the end-user may then request the attachment if they are willing to suffer the delivery time and memory overhead involved. Other systems have produced a method of sending only a limited form of attached files to the user which can then be used on a simple viewer program.

Transcend Mail provides the end-user with two options for downloading email attachments to the mobile device. If the user wishes to download the attachment, he or she can choose between downloading:
  (1) a smaller version of the file translated from its original form (e.g., a text-only version of an MS Word or PDF file) intended for viewing-only using a simple viewer program resident on the wireless terminal; or
  (2) the originl unaltered attachment.

In Transcend Mail these options are presented to the user at the same level of the menu hierarchy.

3.6 One-touch Release

Problems arise as a conventional mobile device begins to be clogged with older emails. Often when the user attempts to "delete" these emails from the mobile device, they are then also deleted from the server at the next synchronisation. This may fly directly in the face of the user's desire—who may simply wish to free up memory on the mobile device, and yet preserve the email on the server. In order to accommodate this, some synchronisation systems give the end user the option either.
  (1) to delete an email entirely on both mobile device and server (which we call a "Delete" instruction), or
  (2) to delete only the copy of the email that is resident on the mobile device—leaving the server unmodified (which we call a "Release" instruction)

In Transcend Mail, these Options are presented at the same level in the menu hierarchy—other systems have either hidden these options within a series of different menu levels, or have dealt with this by asking the user each and every time a deletion is requested whether or not the end user actually wants a complete deletion or merely to clear local memory. Both solutions are not user-friendly, as they reduce flexibility for administering the mobile mailbox and require multiple key entries to accomplish.

3.7 Session Independence

Data communication with mobile telecommunications devices using technology such as GPRS is made extremely difficult due to high latency, intermittent and interrupted coverage, and the cost of metered bandwidth. Traditional communications methods and protocols are not well suited to this type of environment. For example, applications that require a network connection over a wireless link such as GPRS usually use a TCP connection as this gives a reliable session based connection. However, the TCP algorithm was developed for a wired and relatively low-latency connection and is not "wireless friendly". In areas of poor coverage the available bandwidth reduces and this is compounded by TCP which assumes the network is congested and "backs off". The net result of this is that a TCP connection over a cellular wireless network is not an efficient transport. It results in a large overhead of re-sent packets leading to slow and costly data transfers. Further, protocols like TCP rely upon the concept of a communications "session" with a server. A session typically will expire if no traffic passes for a defined period of time (a time out). Establishing each new session requires use of additional data traffic and is also time consuming.

MobileMQ envisages a wireless optimised alternative to TCP using only raw UDP packet transfers. MobileMQ delivers UDP based messages between (1) a mobile device using a wireless network and (2) a server in communication with that device (whether or not directly connected to the wireless network), so as to minimise wasted data traffic as a result of the high latency intermittent connectivity. MobileMQ focuses upon providing, a high level of resilience in the message transmission process, effectively guaranteeing message delivery.

This is accomplished by employing a system for managing data communications that does not rely upon the traditional concept of a "session"—it is "session independent". In addition, the invention provides a method of guaranteeing that messages are properly delivered both to the destination device and to the destination application, while minimising the amount of data traffic transmitted. This has the added benefit of assuring a high degree of resilience with a minimum of data traffic.

MobileMQ is distributed in that it resides on both a sending device and receiving device, typically facilitating message traffic from other systems on the same hardware platforms.

The sending device takes a Message—the core transmission unit—from the sending application (for example, an email program). Each Message is restricted to a maximum size intended to optimise use of data traffic. When a sending application asks the system to send a Message, the system first persists (stores) the Message in local non-volatile memory at the sending device. This assures Message survival even if the sending device suffers a reset. The Message is then compressed and optionally encrypted.

The Message is then segmented for transmission. Each segment is positioned in a UDP packet with the intention that each packet does not exceed a relatively short byte length, which is related to the underlying transport protocol of the low bandwidth high latency network. In a typical implementation in a GPRS environment, the UDP packet length might be restricted to 1500 bytes as 1500 bytes is the typical maximum payload in a GPRS packet. Otherwise if a UDP packet were to occupy, say, 2 GPRS fragments, then a failure of one GPRS packet would mean that both GPRS packets would have to be re-sent. MobileMQ avoids this by scaling the message to match that of the bearer packet.

3.8 Flow Control

Both segment size and transmission rate are controlled by a flow control system that analyses traffic to and from the sending device and strikes a balance between transmission speed and total number of bits transmitted in an effort to keep transmission cost-effective. UDP packets can be received in any order by the receiving device, and the receiving device transmits a packet acknowledgement following receipt of each packet. Where the sending device fails to receive a packet acknowledgement for a packet, the flow-control system delays packet retransmission until a reasonable period has elapsed. The precise length of the delay depends upon network response times observed by the flow control system at the sending device. The delay period and packet size are both continuously recalculated based on changes in observed return times. If a packet acknowledgement is received within a predefined time, the flow control progressively increases the data rate until it peaks.

The flow control system also serves as a replacement for the normal concepts of "session" and "timeout" often used in data transmission devices. If one of the communicating devices suffers a significant connectivity failure (which could arise, for example, due to moving out of range of a wireless base station or moving between roaming networks) the flow control mechanism interprets this as increasingly slow network response, and steps down transmission rates accordingly. If the service outage continues, the flow control continues to lengthen the period between "retries". The net effect is that transmission efforts come—almost—to a complete stop until the sending device starts to receive return traffic from the receiving device. As more reply packets make their way back from the receiving device to the sending device the process reverses: the flow control system starts to "wake up" and becomes more adventurous in its willingness to transmit packets. As the connection becomes more solidly re-established, the transmission rate once again increases until it reaches a reasonably ideal level—balancing overall speed with the need strictly to limit packet loss (as lost packets may still incur network transmission charges). Thus MobileMQ does not rely upon the concept of "session" and does not recognise the concept of a "timeout".

Following receipt of all packets that comprise a Message, the receiving device transmits a brief acknowledgement that the entire Message has been received. Once this Message acknowledgement reaches the sending device, the sending device will not attempt any further resends of packets that made up the Message—even if individual packet acknowledgements have not been sent to or received by the sending device. This is primarily intended to restrict the amount of data traffic. The Message delivery sequence is not yet complete.

After transmitting the Message received acknowledgement, the receiving device then passes the Message to the relevant destination application (such as an email program). The receiving device then awaits a signal from the destination application that the relevant Message has been received and processed in accordance with whatever rule set is employed by the receiving application. The intention is that the receiving application processes the received Message so that it will survive a breakdown in the receiving device—such as a system reset. Once the receiving application is satisfied that it has received the Message irretrievably from MobileMQ, the receiving application then responds with final confirmation that the application has "consumed" the Message. This final confirmation from the receiving application triggers the receiving device side of MobileMQ to send a brief "Message Consumed" acknowledgement to the sending device.

Once the sending device receives the "Message Consumed" acknowledgement, it forwards this information to the sending application and then prepares to transmit the next available Message from the sending application. In this way, MobileMQ guarantees delivery of the entire Message before accepting any additional Message traffic from a sending application.

MobileMQ is able to process Messages from multiple applications simultaneously, but will not process more than one Message from the same application simultaneously.

3.9 Event Based Data Replication

Synchronisation between servers and mobile devices traditionally takes place using relatively high bandwidth, low latency, un-metered connectivity (e.g., USB or IR). As a result, synchronisation systems often employ a methodology that transmits large amount of data and is not very robust when data is lost in transmission or the underlying transmission is interrupted. For example, server based dataset synchronisation typically requires all connected devices to download their entire datasets (e.g. all e-mails, all contacts etc) to the server over a single session, which can then perform a comparison against its master copy of the last fully synchronised dataset in order to update the master and hence all other datasets. This approach is unattractive for synchronising wireless devices because of the power drain it imposes, the potentially long connection time and costly data transfer.

In Transcend Mail, instead of a wireless device downloading its entire dataset, it records only dataset changes (or new 'events') into log (preferably, but not necessarily, time sequential) and sends a log of these events to the server when connected to it. An event gives enough detail to enable data replication to take place without the need for a synchronisation engine; data replication (as opposed to true synchronisation) is more simply achieved by sending events rather than a complete dataset (or sub-sets of a dataset) of stored data for synchronisation by a synchronisation engine at the small server.

Whenever a change to a record on the device is made (e.g. new mail is created and sent from the device; old mail is deleted; a new contact created etc.), an entry defining just this event or change is stored on the device in the time sequential log; this event log is stored until a connection is present, at which point the log contents are sent to the server, which updates its master copy of the relevant datasets. For example, the event might be 'delete record no. x', or delete field 'y' in record 'z'. This is enough information for the recipient to replicate the change that occurred at the sender that generated the event.

There is no need for the device to pass through an entire dataset to determine records that have changed or to ensure maintenance of a single session whilst the entire dataset is transmitted and received. Any changes to the datasets on the server (e.g. receipt of new mail) are also stored as an event log and the log sent to the wireless device using MobileMQ. Because only relatively small event logs are generated and exchanged, the CPU and data transfer overhead are far smaller than conventional sync mechanisms.

Hence, when data subject to replication is entered, modified, or deleted (on either the large server or the small client) the sending device creates and logs an "event" on the sending device.

The event is sent as one or more messages to the receiving device; messages are sent using UDP packet transfer and not the more conventional TCP. Whilst TCP provides a reliable connection and is currently a focus of commercial activity; it is not (as explained above) an efficient transport for wireless because of its pronounced back-off during times of perceived network congestion, which arises not infrequently when wireless coverage is poor, leading to a large overhead of re-sent packets, leading to slow and costly data transfers. For efficiency, UDP is, used (see above) with UDP packet size restricted to 1400 bytes,—just under the transmission packet size available in GPRS.

The receiving device passes individual messages defining the Event to the relevant destination application (such as an email program). The sending device then awaits a signal from the destination application that the relevant message[s] defining the Event has been received and processed in accordance with whatever rule set is employed by the receiving application. The intention is that the receiving application processes the received message[s] so that it will survive a breakdown in the receiving device—such as a system reset. Once the receiving application is satisfied that it has received the message[s] irretrievably, the receiving application then responds with final confirmation that the application has "consumed" the messages. This final confirmation from the receiving application triggers the receiving device side to send a brief "Message Consumed" acknowledgement to the sending device.

Once the sending device receives the "Message Consumed" acknowledgement, it repeats the process for all messages defining an Event until it has been safely received and 'consumed' at the receiving device. It then concludes the "event" process by deleting [event instruction information?] from sending device memory. It repeats this process for all other events in the Event log or queue.

In this way, Transcend Mail guarantees delivery of the entire message before accepting any additional message traffic from a sending application. Processing messages from multiple applications simultaneously is possible, but not processing more than one message from the same application simultaneously.

An entire Event can therefore be sent reliably over a wireless link, despite the use of unreliable UDP.

3.10 A/B/X Flags

The system also guards against duplicate Message transmission by coding each Message with a flag with three state options: A, B, or X. In normal operation, each Message [from an application] is transmitted by the sending device with alternating A or B flags. As the receiving device starts to receive the Message, it writes the A or B flag to local memory. Upon receiving the complete Message from the sending device and the consumed signal from the destination application, the receiving device writes to local memory the flag identity of the Message just processed before transmitting the Message done/Message consumed acknowledgement. If the receiving device resets after sending a Message done/consumed acknowledgement signal but before an acknowledgment is received back, then it will not know if the message consumed was properly received or not. But if it flags the sequence of acknowledgments relating to a given message with one type of flag, then it knows that any acknowledgement back must match the flag in order to be relevant. An acknowledgement with a different flag must relate to the next message and hence should not be actioned.

A flag of X signals the receiving device to ignore the flag and no flag is written to receiving device memory. The intention is for a transmitting application to use the X flag if the application is unconcerned about the risk of duplicate message transmission.

3.11 Client Device Addressing and Network Update

Sending a data transmission to a Mobile device on many current mobile data networks (such as those using GPRS) is made difficult because the mobile device has no fixed IP address. Instead, when the mobile device connects to a network (either the home network or a roaming network) the network operator dynamically allocates an IP address to the device. Further, this dynamically allocated address is usually a private IP address and not directly usable on the public Internet. Instead, data traffic from the device is routed by the network operator to a Network Address Translator (NAT) and the NAT maps the private IP address to a public IP address and ephemeral port numbers drawn from a very limited list of public addresses (sometimes just two) and a larger block of ephemeral port numbers (several thousands usually) available for use by the network operator.

Thus even if a mobile device retains the same dynamically allocated IP address and ephemeral port number for a longer period (e.g., many hours), it might make use of multiple "public" IP addresses and ephemeral port numbers allocated by the network operator. Further, although the mobile device is aware of the private IP address allocated to it by the network operator it will have no record of the public IP address and ephemeral port number allocated by the NAT. From the perspective of anyone communicating with the mobile device, they will "see" only the public IP address and ephemeral port number allocated by the NAT. This creates a significant challenge to anyone who wishes to originate and send a data message for transmission to a mobile device that uses such a network because there is no guarantee that the last known public IP address and ephemeral port number associated with a given device will be valid for more than a few minutes.

MobileMQ provides the small server with network address data on a regular basis to enable routine transmissions of messages from the small server to the mobile device. Examples of implementations would include enabling an office email server to send email traffic to a mobile user without intervention by the mobile user.

The method involves sending an extremely short message (a 'Network Update') from the mobile device to the small server upon the occurrence of any of the following events:
  when the mobile device is first switched on and acquires an address from a mobile network operator,
  when the mobile device receives a new address from a network operator (perhaps as a result of moving the device from home network coverage to a roaming network or between roaming networks)
  whether or not a new address is allocated to the mobile device, on a regular timed basis in an effort to obtain a new public address and ephemeral port number that may have been allocated by an intervening NAT and advise this new public address and ephemeral port number to the small server.

Upon receipt of the short Network Update message, the small server notes the originating IP address and ephemeral port number of the packet (which will be the assigned public IP address and ephemeral port number from the NAT, assuming that the interested party is not directly connected to the same private IP network) and enters this information in a reverse lookup table.

The Network Update messages are intentionally short due to the assumption that data traffic is charged on a metered basis. A typical implementation might involve only 17 bytes of data transmitted by the mobile device and 5 bytes returned in each Network Update message cycle (assuming no packet loss).

Each of these message cycles serves to confirm:
(1) the continuing validity of the public network address and
(2) that the mobile device is available to receive traffic.

The small server is then able to attempt its own—unprompted—data transmissions to the small client on the mobile device by using the most recent address for the device found in the reverse lookup table, assuming that the allocated public IP address and ephemeral port number has not been reallocated from the time of the Network Update message. Hence, receipt at the small server of the Network Update message from a device acts as the trigger to start sending any events queued in the event log (see Event Based Data Replication section 3.9). The system can be configured so that only events present in the log at the time the Network Update is received are sent; any later events have to wait until the next Network Update is received. This differs from continuous push e-mail.

The entry in the reverse lookup table is also timed, and if more than a certain amount of time has elapsed the small server assumes that it is no longer possible to transmit messages to the small client until a new Network Update message is received. In this circumstance, outbound messages from the small server are held in a queue until a new Network Update message is received. The time is set at substantially less than the normal interval used by the NAT to re-allocate public IP addresses to mobile devices (e.g. 5 minutes if the NAT re-allocation interval is 20 minutes). The system can dynamically adjust the time so that when there is very high network useage, associated with much shorter NAT re-allocation intervals, the time can be shortened.

Taken together, this means that the small server and the small client are able to establish a time window during which it should be possible for the small server to send traffic to the small client. The window starts at the time of a Network Update message, and ends when the pre-programmed idle time expires. For example, if Network Update messages are sent by the small client every 60 minutes and the idle timeout is set to 10 minutes, this results in 10 minute communication windows that recur in periods of not less than 60 minutes. By increasing the frequency of Network Update messages the small client can also create more or less continual communication transmission opportunities for the small server.

3.12 Security

Existing security methods to assure secure end-to-end communication over non-secure data communication infrastructure (such as SSL) are not well suited to a wireless data communications environment due to a number of factors, including high processor overhead, high bandwidth overhead, high latency, and dynamic allocation of addressing information to the mobile device.

MobileMQ provides secure end-to-end messaging between a mobile device and a server using a cryptographic implementation designed specifically for a mobile telecommunications device.

The process begins when the system is first installed on the mobile telecommunications device. The mobile device (for example, a mobile email reader connected to wireless network) and the server (for example, a corporate email server connected to fixed line Internet service) are both loaded with shared secret information. In order to secure messages between them, the sending device (either the mobile telecommunications device or the serve) first calculates a message key by using a hash function to calculate a hash from the following inputs:

- a code unique to the relevant mobile device, for example the IMEI code of a GSM telephone handset (if the mobile device is the sending device it uses its own unique code and if the server is the sending device it uses the unique code of the intended recipient device)
- the shared secret, and
- additional data relating to (but not necessarily unique to) each message (i.e., the incrementing message number, application/port number, and session number) that can be calculated independently by both the sending and the receiving devices This key is then used in a symmetric cryptographic algorithm to encrypt the message. Thus each message is encrypted using a key sequence that is mathematically related to the individual mobile device identity code, the shared secret installed on the mobile device and server, and additional data that can be independently derived by both sending and receiving device that is mathematically related to each message.

To assure authenticity and integrity of the encrypted message, the sending device then calculates a Message Authentication Code ('MAC) using a cryptographic hash function where the inputs are the message itself and the key that was used to encrypt the message. The resulting MAC is then appended to the encrypted message.

The receiving device calculates the first hash function (the key) for the relevant message (based upon its knowledge of the mobile device unique code number, the shared secret, and the additional traffic data), and uses this key to decrypt the message. Finally, the receiving device takes the decrypted message and the key and uses these to calculate the second hash value for comparison with the MAC appended to the message. If the second hash value is identical to the MAC received with the message, then it is assumed that the message is authentic and unaltered. If, on the other hand, the second hash value calculated by the receiving device does not match the MAC received with the message, then the receiving device issues a challenge to the sending device in an effort to re-establish secure communication. Once security is established, this then triggers re-transmission of the message. Thus the authentication system serves in a back-up role to assure the data integrity of the message—any bit errors in transmission would result in failure of the MAC, a security challenge, and message retransmission.

In addition to assuring confidentiality, authenticity, and integrity of messages themselves, the security system also serves to reduce the cost and performance impact to the mobile device user if third parties attempt to masquerade as the legitimate mobile device user.

The small server keeps a reverse lookup table with the most recently reported address (and ephemeral port number) assigned to the mobile device. (See description of Network Update at section 3.11) The small server operates on the assumption that all in-bound data packets from the mobile device should come from the address and port number that matches the currently-valid address and port number for the device listed in the small server reverse lookup table.

If data is received that purports to come from the same mobile device but has a new return address (and/or new ephemeral port number), the small server issues a security challenge to the device at the new address using the same cryptographic mechanism outlined above. If the new address returns the correct answer to the challenge, then the small server continues to process in-bound traffic from the new address and also updates the reverse lookup table with the new address. This would normally happen only if the mobile device is assigned a new address or ephemeral port number in such a manner that the mobile device is not aware of the change (e.g., if a network operator NAT box made such an assignment), as changes notified to the mobile device already trigger a Network Update message. (See description of Network Update at section 3.11.)

If, on the other hand, the new address is unable to respond correctly to the security challenge then the small server does not update the reverse lookup table and simply ignores the data received from the new address; This could happen if, for example, a malicious third party attempted to interrupt communication to the legitimate mobile device by sending spoof data traffic to the small server.) Communication with the legitimate device (at the old address with the old ephemeral port number) continues uninterrupted and without the need to re-establish security using an additional challenge to the old address. No unwanted data traffic is generated from the small server to the small client; this is important since, with many GPRS and UMTS tariffs, the users' costs depend on the amount of data traffic received, so being able to bar denial of service attacks at the small server is very valuable.

This system will have a significant cost and performance benefits to the legitimate user because security challenges and responses use relatively large amounts of both processing time and data transfer.

3.13. Terminal Application Lock

Mobile communications terminals (such as "smart" phones using GRPS) present certain security risks to device users and the organisations that act as their primary communications server (such as an employer-operated business email server). Loss of the device could result in unauthorised access to communications applications (such as an email client application), which could then have negative consequences for both the end-user and the organisation providing background server capability. At the moment this security risk is addressed by various systems (1) to lock local access to the mobile device itself—normally at the request of the end user, (2) relying upon mobile operators to deny communications with the device, or (3) deny remote access to the main communications server. The first method is inconvenient to the end-user, as locking the device may deprive the user of access to other applications resident on the device. The second method relies upon swift and appropriate implementation of blocking instructions by the mobile operator. It is further limited in circumstances (such as a GSM network using SIM cards) where authentication with the wireless network is undertaken independently from the mobile device—the person who possesses the device may still be able to access locally resident data. The third method is flawed as it only blocks access to the organisation server, and does not disable access to data locally resident on the mobile device.

Transcend Mail provides a system to "lock" operation of the entire communications application under prescribed circumstances to protect both the end-user and the organisation responsible for a corresponding communications server, without the need for intervention by the wireless network operator that normally carries traffic from the mobile device.

Access to the relevant communications application on the mobile device can only proceed after the end-user has entered the appropriate locking code in the mobile device. The system can specify a minimum code length, but otherwise allows the end-user to change the locking code. The organisation administrator (who also administers the Transcend Mail server) can also change the lock code on a remote basis, thus enabling a code reset if the end-user forgets the code or the device is lost or stolen. This protects e-mail resident on the device and also the mail server, but under the control of the organisation, rather than an end-user or network operator—a critical difference.

In its locked state, the application lock can be de-activated by entering the appropriate lock code into the mobile device.

If the lock code is stored locally on the mobile device, it can be stored using a cryptographic hash value based on the following inputs:
- a unique device ID for the mobile device (such as an IMEI code on a GSM handset)
- a secret key
- the unlocking code This way, the lock cannot easily be circumvented by simply taking the hashed code value from one device and replacing the stored has value on another device.

After being unlocked, the application lock is then triggered by a number of different events, such as:
- passage of time without accessing the application (a predefined idle time)
- remote change of lock code by a system administrator
- end-user requests application lock
- mobile device or the relevant application is rebooted or restarted for any reason
- a remote message directing the application to enter a locked state If the application is in a locked state, the end-user is unable to access local data and is also unable to access the remote server.

APPENDIX I

This Appendix 1 lists and discusses various other ideas of relevance to the MobileMQ and Transcend Mail systems. Vega is an earlier name for Transcend Mail.

1. Independent Delivery of Messages from Different Categories

Description

The use of different transmission 'channels' for messages of differing type, to ensure that certain message types are delivered in a more timely fashion, e.g.:
New message channel
Additional Body text channel
Attachments channel Use of these channels means that new emails can be partially delivered irrespective of whether attachments and body text are being retrieved.

Analysis

This concept is already used to separate the transfer of data pertaining to different applications—for example email has a channel that is distinct from that used by contacts or calendar, and is a common multiplexing technique.

However, there is no evidence of using this technique to expedite communications within a single application in the prior art.

The advantage of using this technique is that sending or receiving a large email would not prevent a more interactive experience with shorter messages concurrent with the background transfer of a large message. Message above a certain size could be transferred by a different message channel and would contend equally for bandwidth with a separate channel for shorter messages. Thus a smaller email whose transmission began after the transmission of a large email could, could complete delivery before the large email. For extremely large emails, this could mean that the response to the small email is received before the large email completes delivery. This is impossible with many contemporary email systems, all of which queue emails irrespective of size.

Some mail systems may make concurrent connections to a mail relay—one for each email—but again there is no 'sorting' of the mails based on size.

2. 'Magic' Email Addresses

Description

Use of identifier strings to be translated by the server into resolved email addresses. This now has 2 facets:
The string <all> in a 'reply' or 'forward' email is interpreted by the Vega server as a command to go to the original email and add all recipients of the message to the 'Cc' field of the new message.
Adding 'friendly names' to an email on the terminal. When the email is sent, all text strings that do not conform to valid email addresses are compared to account names in exchange, and if a match is found, the name is resolved into that user's email address and delivered to them Analysis The use of a fixed string in place of an email address to have a meaning that depends on the content of a previous email is something that is probably new.

The use of such a string effectively constitutes a 'command' to direct the server to complete the addressing of a new email, based on the content of some previous email, known to the Server. In this case, the command is a 'reply to all', the 'content' is a list of email addresses in a previous email, and the 'previous email' is that to which the client is responding. Neither the list of addresses nor the email itself need reside on the client for this concept to work. All that is needed is a reference to the previous email (e.g. a header) in order for the client to have some sort of handle to it.

It is common practice to permit the use of short (or 'friendly') names in place of email addresses that are resolved by a client or server prior to delivery to the recipient(s). However, this is a new concept in the wireless, distributed client space.

3. Enable/Disable

Description

The ability to disable local queuing without affecting queues at the remote other end.

Analysis

The purpose of this function is to allow a peer to temporarily suspend its subscription to synchronisation of events in one or both directions. This may be applied to one, more, or all channels.

Examples of this include:

Suspension of contacts synchronisation by a user whilst local maintenance (e.g. deletion of unwanted items; local, cabled synchronisation with a PC) is carried out that would otherwise generate excessive traffic to keep the remote end in sync Suspension of the service on a per-user basis, by an administrator to control costs or prevent abuse 4. Scheduled Queue Additions.

Description

The ability to perform actions that will result in items being queued for transmission, without the need to transmit the item immediately. E.g. create an email when Vega is disabled. The software will not attempt to send the message until Vega is re-enabled.

Analysis

This function is not new among email clients, both wired and wireless. However, it is new when applied to the wireless, distributed client space.

5. Auto/Manual Mode Operation

Description

The ability to toggle between automatic and manual connection modes.

Analysis

Outwardly, this function is not new among email clients, both wired and wireless. However, there are aspects of this feature that warrant investigation.

It is similar in concept to that provided by Outlook Express where one may check at regular intervals for mail, or only in response to pressing a button in the user interface.

However, such systems are polled systems in which an explicit poll is carried out on expiration of a timer or on activation by the user interface. The functionality in Vega applies to a push solution in which the timed option or manual activation refers to 'opening a gate' for a pre-defined period of time that allows items to be pushed in. This concept is new in the wireless, distributed client space.

6. In-Line Attachment Replacement

Description

The ability to replace the 'placeholder' of an attachment with an administrative message stating the reason that the actual attachment could not be retrieved.

Analysis

This function is not new among email servers—for example, some server-side virus scanners will present an administrative message within the body text of an email stating the reason for non-transmission of an attachment due to virus infection.

However, there are many reasons for non-transmission of attachments to wireless, distributed client.

Some reasons may be elective:

Size exceeds a size set by an administrator

User is not permitted to download attachments (e.g. for cost control reasons)

Some may be circumstantial:

Attachment is not compatible with the terminal and cannot be converted by the server Attachment is infected with a virus Attachment has previously been deleted 7. Remote Attachment Representation Description Displaying an attachment representation in order to show that an attachment is not physically attached to an email, but will be attached before final delivery. Also in sent folder, a representation that an attachment was sent, without the need to hold a local copy of that attachment.

Analysis

Outwardly, this function is not new among email clients, both wired and wireless.

It is similar to the feature of some email clients that show a paperclip or other icon to indicate the presence of an attachment. In IMAP4 clients, the attachment may or may not be actually present.

However, this feature is new in the wireless, distributed client space—particularly if combined with an indication, by different icons or by local inclusion of explanatory body text, of the presence or otherwise of the attachment.

8. Email Recipient List Truncation

Description

The representation of the number of additional recipients of an email message without the need to transmit resolved email addresses for each recipient.

Analysis

This function is new in the wireless, distributed client space.

The intention is that when the number of users in a distribution list exceeds a certain count (e.g. 10), the recipient of the mail is probably not interested in the actual individual users on the list. Hence, data volume may be reduced by not including the names and email addresses of other recipients in the email headers. Rather a simple piece of text (e.g. "38 other recipients") is substituted. The full list of recipients could be downloaded on request.

This special text would not affect the ability of the user to 'reply to all' since the actual email the server would still know actual addresses.

9. Content Hiding when Security is Invoked

Description

The ability to hide on-screen user data by use of an alternate view. This is used to hide all user data when the terminal enters a 'Password challenge' or 'Applocked' state.

Analysis

This function is new in the wireless, distributed client space.

The purpose of the function is to hide privileged information until an authorised person completes the security challenge. This aims to protect against the theft of on-screen information.

10. Intelligent User Creation List

Description

The ability to provide the administrator with a list of users who are suitable for Vega account creation. In reality this means going to Active directory, and sorting users according to which server they are on, and whether a Vega account already exists for that user. The resultant list (displayed in the 'New User' UI) displays only the users that can have a Vega account.

Analysis

The ability to sort a list of users by properties pertaining to each or all of them is not new. However, the application of this to the wireless space is new, specifically in the instance that this list refers to users that have not been configured with distributed clients.

11. Customised Event Logs

Description

The display of log information from 1 or more remote servers, filtered so that only events relevant to the product are displayed.

Analysis

The ability to remotely display filtered log information of remote servers is not new. However, the 'servers' in this case are components of a distributed system that comprise a Client of a larger Client/Server system. The remote display is not part of this Client/Server system, nor is it part of the distributed Client. This is new.

12. File-Level OEM Customisation

Description

The ability to customise a product for a new OEM partner without having to recompile ANY core binaries. Replacement of "OEM" files is all that is required to customise the product.

Analysis

The ability to customise software—within pre-defined boundaries—without rebuilding binaries and without access to source code, is not a new concept.

However, this technique applied to one or more components of a wireless, distributed client/server system is new.

13. 'Intelligent' Queuing

Description

The ability to add, reorder, replace and/or remove items from a pending transmission queue according to 'intelligent' algorithms that are used to analyse the queue's contents.

Analysis

The consolidation of the content of a transmission queue in order to reduce the volume of data transfer required is not a new concept. For example, if a queue contains a new contact followed by its immediate deletion, a simple algorithm could detect such occurrences and remove both the new contact and its deletion since the two effectively cancel each other out.

However, this technique applied wireless, distributed client/server systems is new, particularly since the aim is to reduce the amount of data transferred over a metered network.

14. Retrieval Cancellation Prior to Transmission

Description

The ability to cancel a retrieval request BEFORE the data transfer has begun.

Analysis

This is similar to the ability to remove an item from an Outbox, and may apply to email, contacts and agenda items. It is certainly not a new concept since many email and groupware clients provide this functionality.

However, this technique applied in wireless, distributed client/server systems is new—particularly since the destination of the items in the 'outbox' is not a mail or groupware server, but another component in a distributed client. Only after transmission to the remote component distributed client do items truly enter an 'outbox' pending transmission to some further destination (e.g. on the internet). It is the initial transfer that is cancellable by this function.

15. Poll and Push Users

Description

The ability to create 'Poll' and 'Push' operation user accounts within a single organisation or installation.

Analysis

This function allows some users to operate in a true push mode, others in a strictly polled mode, and others in a mode that is 'effectively push' due to the frequency of polls.

This concept is not new among general email clients—the choice of one user's preferences for email delivery does not usually have any effect on the choices made by users.

However,
 This function applies to Vega, which operates specifically in the wireless space. Such systems are usually 'all push' or 'all poll' as dictated by the design philosophy adopted by the system.
 The terms 'push' and 'poll' apply to communications within the distributed client—not within the larger Client/Server model, which is always 'push'.

Hence, there are novel concepts.

16. Provisioning Logic

Description

The ability to modify, negate or deny the handset provisioning process based upon information about the user selected account and connected handset.

Analysis

The purpose of this invention is to direct a provisioning user with a list of possible options that are open to him based on the circumstances presented by the status of existing accounts and the status of the connected handset.

The concept may not be new, however, the application of this invention is to the two components of the distributed client model and the forging and breaking of the links between them:
 If the user account selected is permitted to use Vega but does not have a handset allocated
  If the handset is currently allocated to another user
   No configuration is possible: an administrator must remove the allocation
  If the handset is currently not provisioned:
   The software is installed and a base synchronisation is performed.
 If the user account selected is permitted to use Vega and has a handset allocated
  If the handset is currently allocated to the user
   The handset software installation is repaired if necessary
   The handset is left unmodified if appropriate
  If the handset is currently allocated to another user
   No configuration is possible: an administrator must remove the allocation
  If the handset is currently unprovisioned
   The allocation is modified; the user's current handset is wiped
   The software is installed and a base synchronisation is performed.

If the user account selected is not permitted to user Vega
    Further action for that user is not permitted
17. Wipe Handset
Description
    Ability to send a command to a user's device that will result in the removal of all data from that device.
Analysis
    The purpose of this command is to instigate remote deletion of all data on the device. An administrator would take this rather extreme course of action in the event that a handset is lost or stolen. There is little that a user can do to prevent the device from becoming non-functional.
    This feature is new, particularly in the field of wireless, distributed clients.
18. Data Transfer Timestamp
Description
    Storage and display of the timestamp of the last time data was sent or received from a user's terminal.
Analysis
    The purpose of this feature is to record the time and data of the last data transfer received from the remote component of the distributed client. This provides the user with a confidence check that the system is working in the absence of any application data.
    large elements of this feature may be reasonably apparent to a competent person. However, owing to the underlying unreliable nature of the transport, it is not possible to determine the exact time of the last transfer from terminal to server. However, since all communications in either direction result in at least a confirmation of some sorts in the other, recording the last incoming data provides proof that at least some outgoing data was received.
19. Software Installation
Description
    The ability to install (and subsequently uninstall) software from a Symbian OS product WITHOUT using the standard (SIS file) method for software installation.
Analysis
    The purpose of the Symbian SIS file is to ease installation in much the same way as is frequently achieved in other software environments through the likes of InstallShield and others.
    However, the connectivity platform used by SymbianOS devices no longer permits the automatic execution of SIS files, thus it is not possible for an administrator to instigate the installation of software without physically interacting with the device (i.e. pressing buttons, interacting with the Inbox, etc).
    The nature of this feature is to avoid the installation system altogether by copying files into certain folders such that on restarting the device, certain 'run-once' components are executed that complete the installation and configuration of the device. This permits per-device installations that would otherwise require complicated re-compilations of the SIS file.
    The only course of action required by the installer is to power-down the device before handing it over to the user. This guarantees that the installation sequence completes.
20. Security Updates in the Field
Description
    The ability of an administrator to update terminal security policies on user's terminals in the field (e.g. increasing the minimum number of digits or timeout period of the application lock).
Analysis
    The purpose of this invention is to permit the administrator to remotely change certain security credentials of devices without requiring them to be re-provisioned or returned to him to implement the change.
    Such changes may include:
    A change in the policy of the minimum strength of application lock code that a user is required to choose—this may force a change of code for some users
    A scheduled change in the shared secret used by a device
    A demand that a user change his logon password
    Such features are new in the wireless field, particularly where the destination of the reconfiguration is a component of a distributed client.
21. Poll/Push Updates in the Field
Description
    The ability of an administrator to remotely change the frequency of micro-polling, or to change the characteristic of connectivity from poll to push (and vice-versa) for individual terminals and users.
Analysis
    An administrator may require changing the frequency of polling for certain users in response to:
    Policy change regarding the types of expenditure permitted by certain users
    To target particular users to change volume habits
    The features of this invention allow an administrator to change any or all of the following on a per-user basis:
    Change of the frequency of micro-polling to change the amount of background data volume in the absence of any application data
    Change of the frequency of micro-polling to enable or disable 'effective push' by reference to the NAT mapping timeout on any Network Operator
    Change to or from true 'push' mode in which case no micro-polls are used
    This feature is particular to the internal communication of the components of a distributed client in the wireless space. In one implementation, the user has no control over the above: the administrator is the sole privilege of these settings.

The invention claimed is:
1. A data access, replication or communications system comprising:
    a terminal including an electronic memory storing a terminal-side packet-queuing executable and a processor provided to execute the terminal-side packet-queuing executable to enable communication therewith independent of a session-based transport layer protocol, the terminal-side packet-queuing executable dividing a message into a plurality of packets; and
    a server including an electronic memory storing a server-side packet-queuing executable and a processor provided to execute the server-side packet-queuing executable to enable communication therewith independent of a transport layer session-based protocol, each said packet-queuing executable dividing a message into a plurality of packets,
    wherein a sending one of the terminal-side packet-queuing executable and the server-side packet-queuing executable transmits a next packet of the message over a radio network using a session-independent transport layer protocol upon acknowledgement of receipt of a previously transmitted packet of the message at by a receiving one of the terminal-side packet-queuing executable and the server-side packet queuing executable, the terminal-side packet queuing executable and the server-side packet queuing executable together constituting a software application that is distributed between the terminal and the server in a predetermined functional proportion and cooperatively functions as a client of a second server, the second server performing a data handling service related to the message.

2. The system of claim 1 wherein the message queuing software application is message oriented middleware.

3. The system of claim 1 wherein the terminal-side packet-queuing executable insulates a terminal program from being affected if a connection over the radio network is broken by queuing packets in readiness for the connection to be re-established, enabling the terminal program to proceed to another task.

4. The system of claim 1 wherein the server-side packet-queuing executable insulates a server program from being affected if a connection over the radio network is broken by queuing packets in readiness for the connection to be re-established, enabling the server program to proceed to another task.

5. The system of claim 1 wherein each message that is queued defines part or all of an event, the event describing a change to data stored at either the terminal or the second server in enough detail to enable data replication to take place without a need for a synchronization engine, data replication being achieved by sending events rather than a complete dataset of stored data for synchronization.

6. The system of claim 5 wherein the terminal-side packet-queuing executable can create and queue packets defining events, enabling the terminal to proceed to another task, even if a network connection over the radio network is broken.

7. The system of claim 5 wherein the server-side packet-queuing executable can create and queue packets defining events, enabling the second server to proceed to another task, even if a network connection over the radio network is broken, the packets being queued in one of the server-side packet-queuing executable and a message queuing system.

8. The system of claim 6 wherein the queued packets persist in non-volatile memory when the terminal is switched off.

9. The system of claim 7 wherein queued packets events persist in non-volatile memory when the server is switched off.

10. The system of claim 6 wherein packets queued on the terminal side include data indicative of references to data stored on the server.

11. The system of claim 1, wherein a terminal-side component of the message queuing software application insulates the terminal program from being affected if a connection over the radio network is re-established by automatically causing a next packet in a terminal-side queue to be sent.

12. The system of claim 4, wherein a server-side component of the message queuing application software insulates the server program from being affected if a connection over the radio network is re-established by automatically causing a next packet in a server-side queue to be sent.

13. The system of claim 1 wherein the terminal-side executable processes events from a terminal program, which is an e-mail or PIM program.

14. The system of claim 1 wherein the server-side packet-queuing executable processes events from a server program running on the second server, the server program including a mail server program.

15. The system of claim 1 wherein the terminal is a wireless terminal such as a mobile telephone or smartphone.

16. The system of claim 1 wherein the radio network is a wireless WAN network such as a GPRS or UMTS network.

17. The system of claim 1 wherein the server stores a logon password sent from the terminal and can use the logon password to access the server program running on the second server.

18. The system of claim 1 wherein the terminal monitors available memory on the terminal and automatically deletes data stored on the terminal that meets a pre-defined criteria of at least one of age, use and size without affecting a corresponding data stored on the second server.

19. The system of claim 18 wherein a user option to delete data stored on the terminal without affecting the corresponding data stored on the server is displayed at a same level in a menu hierarchy, displayed on the terminal, as an option to delete data stored on the terminal together with the corresponding data stored on the second server.

20. The system of claim 18 wherein the data is message data and the terminal retains data that allows the message data to be re-supplied from the second server if requested by a user.

21. The system of claim 18 wherein data is not released from memory if the data is marked as unread, open for user viewing or action, or there is a pending action related to the data requesting additional data from the second server.

22. The system of claim 1 wherein the terminal enables a user to select a release option to delete a message stored on the terminal without deleting a corresponding message stored on the second server and to select a delete option to delete a message stored on the terminal and the corresponding message on the second server, the release and delete options appearing at a same level in a menu hierarchy displayed on the terminal.

* * * * *